Jan. 5, 1960 R. C. WILTON 2,919,924

AUTOMATIC RECORD-CHANGING PHONOGRAPH

Filed Feb. 7, 1958 2 Sheets-Sheet 1

Inventor

RAYMOND C. WILTON

By

Holcombe, Wetherill & Brisebois

Attorneys

Jan. 5, 1960 R. C. WILTON 2,919,924

AUTOMATIC RECORD-CHANGING PHONOGRAPH

Filed Feb. 7, 1958 2 Sheets-Sheet 2

Inventor
RAYMOND C. WILTON
By Holcombe, Wetherill + Brisebois
Attorney

United States Patent Office 2,919,924

Patented Jan. 5, 1960

2,919,924

AUTOMATIC RECORD-CHANGING PHONOGRAPH

Raymond Charles Wilton, Barking, England, assignor to Collaro Limited, Barking, England, a British company Application February 7, 1958, Serial No. 713,904

Claims priority, application Great Britain February 12, 1957

6 Claims. (Cl. 274—10)

In automatic record-changing gramophones, a stack of records which are to be played one after the other is commonly supported on a magazine spindle which projects upwards from the centre of the turntable. Some such gramophones are arranged to play records of differing sizes mixed together indiscriminately in the stack.

Such gramophones must have a mechanism to control the movement of the pick-up arm to ensure that the stylus is correctly set down on the edge of a record on the turntable when playing of the record starts. Various mechanisms have been used for the purpose of measuring the diameter of the record to be played and to set the mechanism for moving the pick-up arm accordingly.

In one of these mechanisms, a feeler is moved inwards until it is brought into engagement with the periphery of the record next to be played. The position in which this feeler is arrested during its inward movement sets the mechanism for controlling the movement of the pick-up arm. This feeler may be the pick-up arm itself which makes an initial inward movement before the record to be played is dropped on to the turntable and then makes a second inward movement in which the pick-up stylus is set down on the edge of the record after the record has fallen on to the turntable.

When records of different sizes are indiscriminately mixed together, it is essential that the feeler shall come into contact with the periphery of the next record to be played and shall not be interfered with by other records of larger sizes in the stack. To enable the feeler to come into contact with the next record to be played in this way, spindles have been designed which arrest the bottom record in the stack, when it is dropped, in an intermediate position between the turntable and the bottom of the remainder of the stack. In this intermediate position, the record is clear of records of larger size in the stack and the feeler is brought into contact with the periphery of the record whilst it is in this intermediate position.

Such spindles have been of complicated construction and have usually been formed with a step on which the stack of records is supported. This step is formed at the junction between the lower part of the spindle and the upper part which projects through the holes in the stack of records and which is laterally offset from the lower part. Such spindles are expensive to manufacture.

The object of the present invention is to provide a magazine spindle which will arrest the record next to be played on the turntable in an intermediate position and which is simple and cheap to construct.

According to the present invention, the spindle is formed by a straight tube having a slot which extends diametrically through the tube along part of its length and within which a record support is movably mounted, an operating rod, which is arranged to be moved by a record-changing mechanism in the gramophone, extending upwards through the tube to the slot for controlling the movement of the record support between two limiting positions. In the first position a surface on the support projects from the slot to support the stack of records and a second surface on the support projects from the slot to support a single record in an intermediate position between the bottom of the stack and the turntable and in the second position both these surfaces are retracted and a third surface on the support projects from the slot with the result that the stack of records is allowed to fall on to the third surface and the single record is allowed to fall on to the turntable. A return of the support to the first position then causes the first and second surfaces to project again and the third surface to be retracted so that the lowermost record of the stack is dropped into the intermediate position and the remainder of the stack is supported on the first surface.

Preferably, the record support comprises three members pivotally mounted on a common axis in the slot. Two of these members move together and perform a scissors movement with the third member which is mounted between them. Each member has a surface which projects from the slot for supporting the stack of records and a surface which projects from the slot for supporting the single record in the intermediate position when the members are in the first position. One surface on each member projects from each side of the slot and the two members are urged by a spring towards the third member to perform a closing scissors movement to retract the surfaces and move the members into the second position.

The surface on to which the stack of records is allowed to fall may be formed on an arm on the third member. This surface projects from the side of the slot opposite to that from which the surface on the third member for supporting the stack of records projects. The surface on the arm on to which the stack of records falls is disposed less than the thickness of a single record below the surfaces on the three members which project to support the stack of records when the members are in the first position.

An example of a magazine spindle constructed in accordance with the invention is illustrated in the accompanying drawings, in which.

Figure 1:
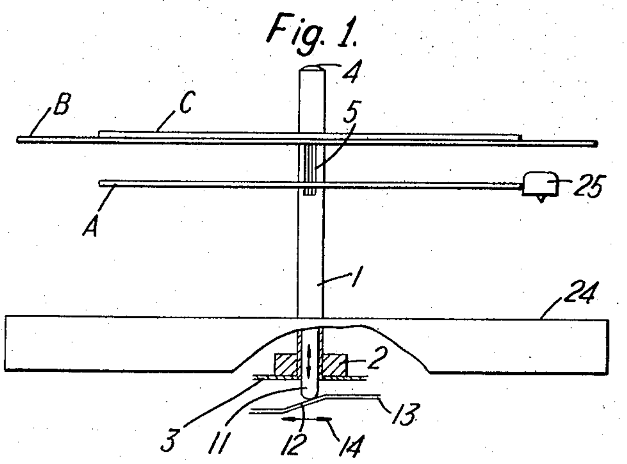
Figure 1 is a diagrammatic side elevation of an automatic record-changing gramophone partly in section.

As shown in Figure 1, the magazine spindle comprises a straight tube 1 supported at its lower end in a collar 2 which is fixed to the unit plate or chassis 3 of the gramophone. The upper end of the tube 1 is closed by a plug 4. A slot 5 is cut diammetrically through the tube 1 towards its upper end. A record support consists of two identical members 6 and 7 and a further member 8 pivotally mounted within the slot 5 on a pin 9 which is fixed in the wall of the tube 1. The members 6 to 8, being pivoted near their centres, perform a scissors movement and are biassed into a position in which they are closed together by a torsion spring 10. An operating rod 11 extends from below the unit plate or chassis 3 through the tube 1 and has its upper end in contact with the members.

As shown in Figure 1, the operating rod 11 can be moved upwards and downwards by an inclined surface 12 on a bar 13 which is reciprocated to and fro in the direction of the arrow 14 in the usual way by a record change mechanism which is not illustrated.

Figure 2:
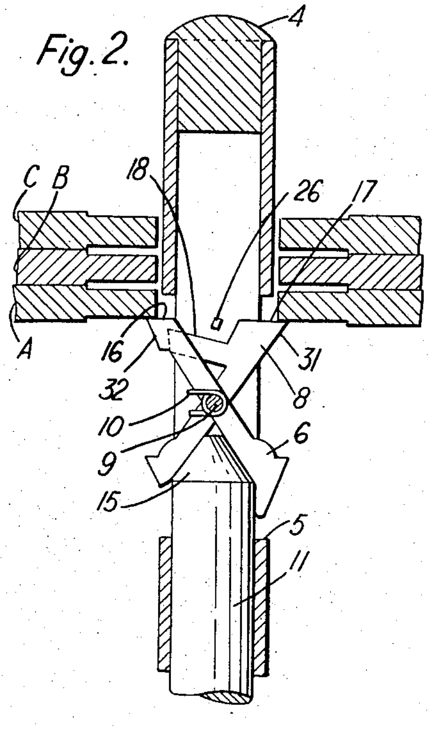
Figure 2 is a vertical section on the centre line of the top of the spindle with a stack of records supported in their normal position.

The operating rod 11 has a conical surface 15 on its upper end which engages between the members 6 and 7 and the member 8. In the normal rest position of the magazine spindle whilst a record is being played on the turntable, the operating rod 11 is pressed upwards by the inclined surface 12 and the conical surface 15, acting as a wedge, moves the members 6, 7 and 8 apart in the position shown in Figure 2. A stack of records A, B and C are then placed over the upper part of the tube 1 and rest on projecting surfaces 16 and 16*a* on the members 6 and 7 respectively and on the surface 17 on the member 8.

Figure 3:
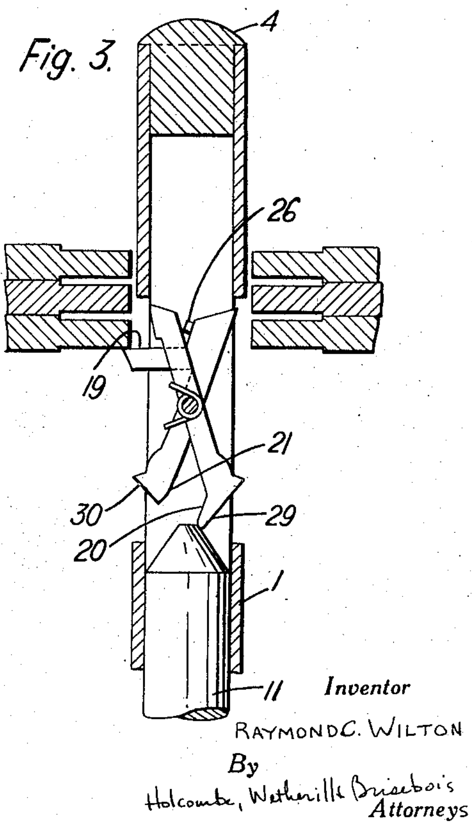
Figure 3 is a section similar to Figure 2 but showing the initial position of the supporting members at the start of a record change cycle.
Figure 4:
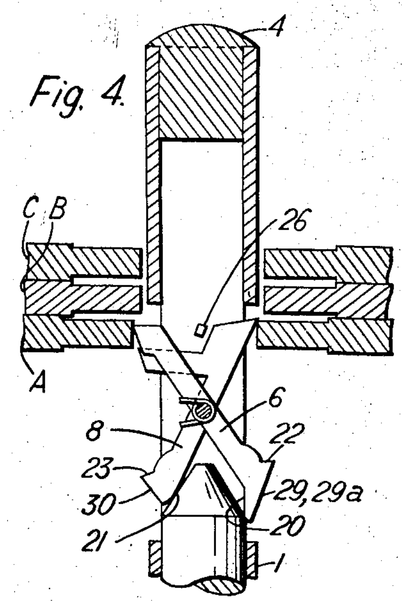
Figure 4 is a section similar to Figure 2 showing a later stage in the record change cycle.
Figure 7:
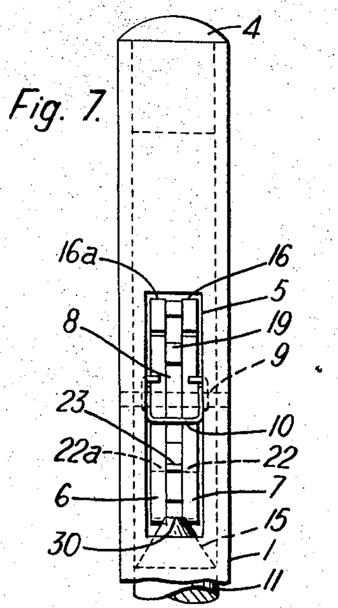
Figure 7 is an elevation of the top of the spindle as seen at right angles to the direction of Figures 2 to 6.

When the gramophone is set in operation, the bar 13 is moved to the right as shown in Figure 1 and the operating rod 11 is moved downwards into the position shown in Figure 3. As the conical surface 15 is withdrawn from between the members 6 and 7 and 8, these members are closed together by the spring 10 so that the surfaces 16, 16*a* and 17 are retracted from under the record A within the slot 5. The movement of the member 8 is limited by a stop 26 projecting from the wall of the tube 1. The member 8 has an arm 18 which is caused to project from the left hand side of the slot 5 as seen in Figures 2 to 6 as the surface 17 is retracted within the right hand side of the slot 5. The stack of records A, B and C thus fall on to a surface 19 on top of the arm 18.

Figure 5:
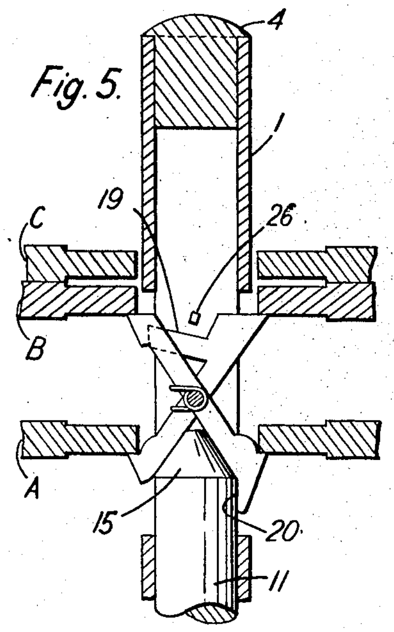
Figure 5 is a section similar to Figure 2 showing the end of the first record change cycle.

The operating rod 11 is then moved upwards again by the inclined surface 12 as the bar 13 is moved again towards the left as shown in Figure 1. The conical surface 15 comes into contact with a foot 20 on the member 6 and a corresponding foot 20*a* on the member 7 and causes the members 6 and 7 to rotate in a counter-clockwise direction as seen in Figures 2 to 6 into the position shown in Figure 4. In moving into this position, because the surface 19 is less than the thickness of the record A below the surfaces 16 and 16*a*, the top of the members 6 and 7 engage the inside surface of the hole through the record A and press this record towards the left so that it is moved off the surface 19 on the arm 18. The record A then starts to fall towards the position in which it is shown in Figure 5.

Records B and C also, of course, fall but record B is supported on the surfaces 16 and 16*a*, on the members 6 and 7. Whilst the records are falling, the operating rod 11 continues to move upwards and comes into engagement with a surface 21 on the member 8 causing this member to rotate in a clockwise direction. The surface 19 is thus retracted within the slot 5 and the surface 17 is caused to project from the right hand side of the slot 5 and assists in supporting the records B and C.

At the same time as the surfaces 16, 16*a* and 17 are caused to project from the slot 5, further surfaces 22, and 22*a*, on the members 6 and 7 respectively and a surface 23 on the member 8 are also caused to project from the slot 5. The record A is supported on these surfaces 22, 22*a* and 23 in an intermediate position between the bottom of the stack of records supported on the surfaces 16, 16*a* and 17 and the turntable 24. Whilst the record A is in this intermediate position, a pick-up 25 is caused to move inwards into contact with the periphery of the record A.

The position in which the pick-up 25 is arrested during this movement depends of course upon the diameter of the record A and a mechanism for later moving the pick-up 25 to the stylus set-down position is preset in dependence upon this diameter. After the initial inward movement into contact with the periphery of the record A, the pick-up 25 is moved outwards again and the operating rod 11 is once again moved downwards into the position shown in Figure 3.

Figure 6:
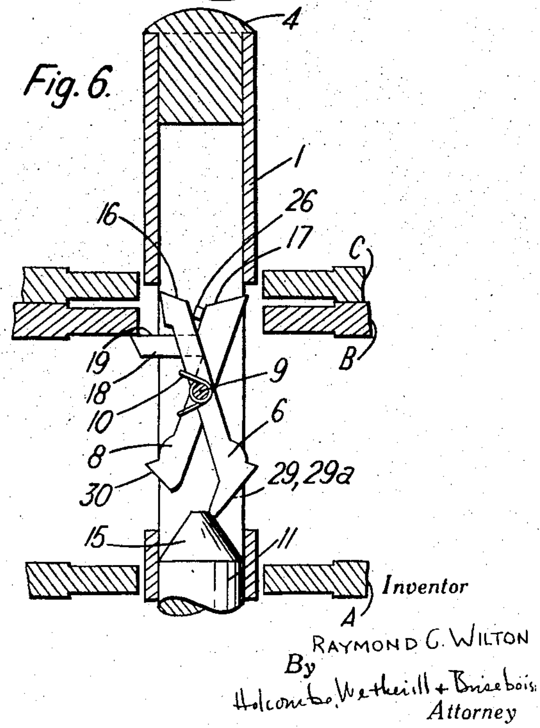
Figure 6 is a section similar to Figure 2 showing the start of the next record change cycle.

The state of affairs after this second downward movement is shown in Figure 6. The record A is released from the surfaces 22, 22*a* and 23 and falls downwards on to the turntable 24 and the records B and C fall on to the surface 19. As the operating rod 11 is moved upwards again, the record B falls into the intermediate position on the surfaces 22, 22*a* and 23 and the record C remains supported on the surfaces 16, 16*a* and 17. The pick-up is then moved inwards and since the mechanism for moving it has been preset, the stylus is placed on the edge of the record A which is now on the turntable. This record is then played in the usual way. The pick-up then moves outwards from the centre of the record played to make a further testing movement in which it is brought into contact with the periphery of the record B in the intermediate position. This cycle of operations repeats itself until all the records in the stack have been played.

The mechanism for moving the pick-up and for presetting its mechanism is not illustrated since this is of any known construction such as are used with other magazine spindles arranged to support a record in an intermediate position to allow its diameter to be gauged. After all the records placed on the magazine spindle have been played they are removed from the turntable by lifting them up the spindle. The edge of the central hole in the top record engages with the inclined surfaces 29, 29*a* and 30 on the members 6 to 8 respectively and moves these members in a position between those shown in Figures 2 and 3. The records can then be moved upwards further, again moving the members into this same position by engagement of the top record with the surfaces 31, 31*a* and 32. Thereafter the records can be freely removed from the top of the spindle.

As an alternative construction the tube 1 can be detachably mounted in the collar 2. Removal of the whole spindle then allows the records to be lifted directly from the turntable.

I claim:

1. In an automatic record changer, a turntable, a magazine spindle for supporting a stack of disc records projecting upwards from said turntable and release means for releasing the lowermost record in said stack and causing said record to fall downwards along said spindle, said spindle comprising a straight tube having a slot extending diametrically through it along part of its length, a pivot pin extending transversely across said slot, at least two support members pivotally mounted between their ends on said pin, an upper supporting surface at the upper end of each of said members, an outwardly projecting lower supporting surface and an abutment surface at the lower end of each of said members, and an arm extending laterally from one of said members toward the other just below said first support surfaces, said members being mounted for pivotal movement in opposite directions between a first position in which they cross each other at said pivot pin with said upper supporting surfaces projecting from said slot to support a stack of records and said lower supporting surfaces projecting from said slot to support a single record therebelow but above said turntable, and a second position in which the ends of said support members are brought more closely together with said upper and lower supporting surfaces retracted within said slot and said arm projecting therefrom to support said stack, said release means comprising means for moving said support members in both directions between said two positions and including an operating rod extending upward through said tube and means for reciprocating said rod between a lower position occupied when said supports are in their second position and an upper position in which said rod engages the abutment surfaces of said support members to swing them into their first position, the upper end of said other supporting member driving the lowermost record of said stack off of said slightly lower arm while said upper supporting surfaces slide under the remainder of said stack as said support members move from said second position to said first position, thus permitting said lowermost record to fall to said lower supporting surfaces, from which it falls to said turntable when said lower supporting surfaces are retracted as said support members move from said first position to said second position.

2. A record changer as claimed in claim 1 in which the abutment surface of said other support member extends below the lower end of said arm carrying member so that said other support member is the first to be engaged and swung by said operating rod as it rises toward its upper position.

3. A record changer as claimed in claim 1 in which said support members are spring biased toward their second position.

4. A record changer as claimed in claim 1 in which said arm carrying support member is mounted between a pair of other support members which swing as a unit.

5. A record changer as claimed in claim 1 in which the upper ends of said support members move in a path approximately a record's thickness below the upper end of said slot, so that outer wall of said spindle above said slot engages the edges of the central holes in all but the lowermost records in said stack and thereby prevents lateral displacement of any records in said stack above said lowermost record.

6. A record changer as claimed in claim 1 provided with stop means in said slot between the upper ends of said support members which prevents said upper ends from swinging past each other.

References Cited in the file of this patent

FOREIGN PATENTS

| | | |
|---|---|---|
| 849,014 | Germany | Sept. 11, 1952 |
| 896,125 | Germany | Nov. 9, 1953 |
| 251,441 | Switzerland | Aug. 2, 1948 |